United States Patent [19]

Haake et al.

[11] Patent Number: 4,496,417
[45] Date of Patent: Jan. 29, 1985

[54] CONTROL STRETCH LAMINATING DEVICE

[75] Inventors: Joseph R. Haake, Broomfield; Tracy J. Fowler, Denver; James W. Jensen, Boulder, all of Colo.

[73] Assignee: Adolph Coors Company, Golden, Colo.

[21] Appl. No.: 441,276

[22] Filed: Nov. 12, 1982

[51] Int. Cl.³ ............... B32B 31/00; B32B 31/04; B65H 25/00; B65C 11/04
[52] U.S. Cl. .................. 156/361; 156/443; 156/495; 156/543; 156/549; 156/550; 156/578; 226/27; 226/28
[58] Field of Search ......... 156/351, 361, 443, 494, 156/495, 500, 547, 543, 549–551, 578, 582; 226/27, 28; 53/51

[56] References Cited

U.S. PATENT DOCUMENTS

| | | | |
|---|---|---|---|
| 3,127,292 | 3/1964 | Early | 156/361 |
| 3,762,125 | 10/1973 | Prena | 53/51 |
| 3,806,390 | 4/1974 | Balk et al. | 156/495 |
| 3,887,419 | 6/1975 | Geschwender | 156/361 |
| 4,254,173 | 3/1981 | Peer, Jr. | 428/205 |
| 4,397,709 | 8/1983 | Schwenzer | 156/361 |

Primary Examiner—Michael Wityshyn
Assistant Examiner—Merrell C. Cashion
Attorney, Agent, or Firm—Klaas & Law

[57] ABSTRACT

A laminating apparatus for laminating extensible plastic film material to a paper backing material to form a laminated composite. The apparatus comprises mechanical stretch control means for controlling the stretch or relaxation of the film material prior to lamination with the paper material. The apparatus also comprises means for monitoring the amount of film stretch in the laminated composite and providing data therefrom to a data processing unit which provides control signals to operate the mechanical stretch controlling means.

29 Claims, 5 Drawing Figures

CONTROL STRETCH LAMINATING DEVICE

BACKGROUND OF THE INVENTION

The present invention relates generally to the production of laminated paper products and more particularly to a method of lamination and a device for laminating a continuous roll of extensible plastic film material to a continuous roll of paper backing material wherein the device has a system for controlling the amount of stretch in the plastic film material to ensure proper registry of the film material with the paper material.

Lamination of a plastic film material to a paper material has been found to be particularly advantageous where paper products having high strength and abrasion resistant qualities are required. Such laminated composites are particularly desireable in the packaging industry, where artwork may be printed on the interior side of the plastic film to produce a high quality display package. The construction and use of such laminated composites are described in Peer, U.S. Pat. No. 4,254,173 which is hereby incorporated by reference.

In producing a laminated composite of the type described in Peer, both the plastic film material and the paper material may be provided in continuous sheets from spools. The paper and the plastic film generally pass over a number of roller type devices where each of the materials are independently stretched out under tension and treated as necessary depending upon the particular end use for the laminated composite. For example the plastic material may be irradiated in conventional processes to increase its strength or improve its printability. In preferred embodiments the plastic is printed with various graphics and provided with a metalized background over the graphics to enhance the package appearance. The paper may undergo treatment as well such as being electrostatically charged to aid in the bonding process. Either the film material or the paper material or both are treated thereafter with suitable adhesive to provide a bond between the paper and film. To complete the laminating process, the paper and film material are pressed together between opposed rollers to produce a smooth flat composite. Various heating or cooling processes may also be required to ensure proper adhesion of the surfaces, depending on the type of the film, paper, and adhesive agent which are being used in the process. The end product of the process is a laminated composite which may be fed directly to cutting dies or other machines for further processing. The composite may also be taken up directly on a separate spool for storage and later processing.

Use of the film/paper composite provides many advantages over conventional packaging material but also creates some unique problems. In order to be cost effective, the plastic material used is generally quite thin; on the order of 0.25-2.0 mils. Plastic films of such thicknesses tend to stretch or shrink during the lamination process as a result of variations in temperature and the different inertial forces exerted on the film as it is unrolled and processed prior to bonding with the paper. Such stretching and shrinking may cause warping or buckling in the laminated composite as the film returns to a steady state condition. Similarly, a printed image may be repeated on the film for later lamination, in registry with predetermined lengths of paper material. In such cases the printed image length must be held within close tolerances in order to permit proper registery with other processing activities such as automated cutting in a later process step.

Thus it can be seen that a need exists for a paper/film laminating device which is capable of controlling the amount of stretch in the plastic film material prior to lamination.

SUMMARY OF THE INVENTION

The present invention comprises a laminating device and method for applying extensible plastic film material to paper material in a manner which monitors and controls the amount of stretch in the plastic material. The film material is unwound from a film spool by two or more drawing rolls around which the film is wrapped. The film is wrapped around the drawing rolls in a manner which produces sufficient frictional contact for drawing the film from the film spool. Although many wrapping variations might be used, it has been found that a so-called "S-wrap" configuration over two rolls is a very effective means for producing this drawing or "nip" effect. In a preferred embodiment the film material thereafter passes over one or more idler rolls which position the film at a proper angle for entry into a laminating nip formed by two or more laminating rolls. The laminating nip is generally formed by a power driven main roll and a compression roll positioned in touching or near touching contact therewith. The paper and film are drawn by the laminating rolls while being compressed between them. Thus the film material is conveyed by two separate motive means which in a preferred embodiment comprise the drawing rolls and the laminating rolls. By varying the speed of one set of rolls with respect to the other set of rolls the tension in the film web between the two sets of rolls may be increased or decreased causing the film to correspondingly stretch or relax prior to entering the laminating rolls. Although such stretch control might be obtained by use of spaced apart drawing means other than the lamination rolls, use of the laminating rolls for this purpose elimate the need for additional rolls and achieves the synergistic result of simultaneously stretching the film to a proper length while laminating it with the paper material.

As the laminated composite leaves the laminating rolls, monitoring means such as one or more photoelectric assemblies can be provided to detect the passage of preprinted marks on the film. This information is supplied to a data processing unit which detects any variance between the design (ideal) distance and the actually measured distance between the marks. The information from the photoelectric assemblies is processed by a data processing unit in a manner which provides a output command signal to the driving means for the draw rolls to automatically adjust the surface component of rotational speed of the draw rolls with respect to the surface component of rotational speed of the laminating rolls in order to provide the proper amount of stretch in the film. Information may be displayed in operator readable form to allow the operator to input certain time response commands relating to the system operation.

Although the draw rolls and laminating rolls might be driven by separate drive units such as individual electric motors, minor fluctuations in the speed of the different drive units such as might be caused by transient voltage fluctuations could seriously interfer with the system performance. Thus, a single main drive unit for both roll systems is generally preferred, with a correction motor differential system provided for increasing or decreasing the speed of the draw rolls above or below a base speed component provided by the main drive unit.

It is among the objects of the present invention to provide a laminating device for forming a plastic paper composite wherein the stretch of the film material is monitored and controlled.

It is a further object of the invention to provide a film/paper laminating device wherein the film stretch is monitored by a photoelectric sensing system.

It is a further object of the invention to provide a film/paper laminating device utilizing S-wrap rolls to controll the amount of stretch in the plastic film prior to lamination.

It is a further object of the invention to provide a film/paper laminating device which utilizes a data processing means.

It is a further object of the invention to provide a film/paper laminating device which is safe, efficient and cost effective to operate.

BRIEF DESCRIPTION OF THE DRAWING

Various illustrative embodiments of the invention are shown in the accompanying drawing in which.

DETAILED DESCRIPTION OF THE INVENTION

Figure 1:
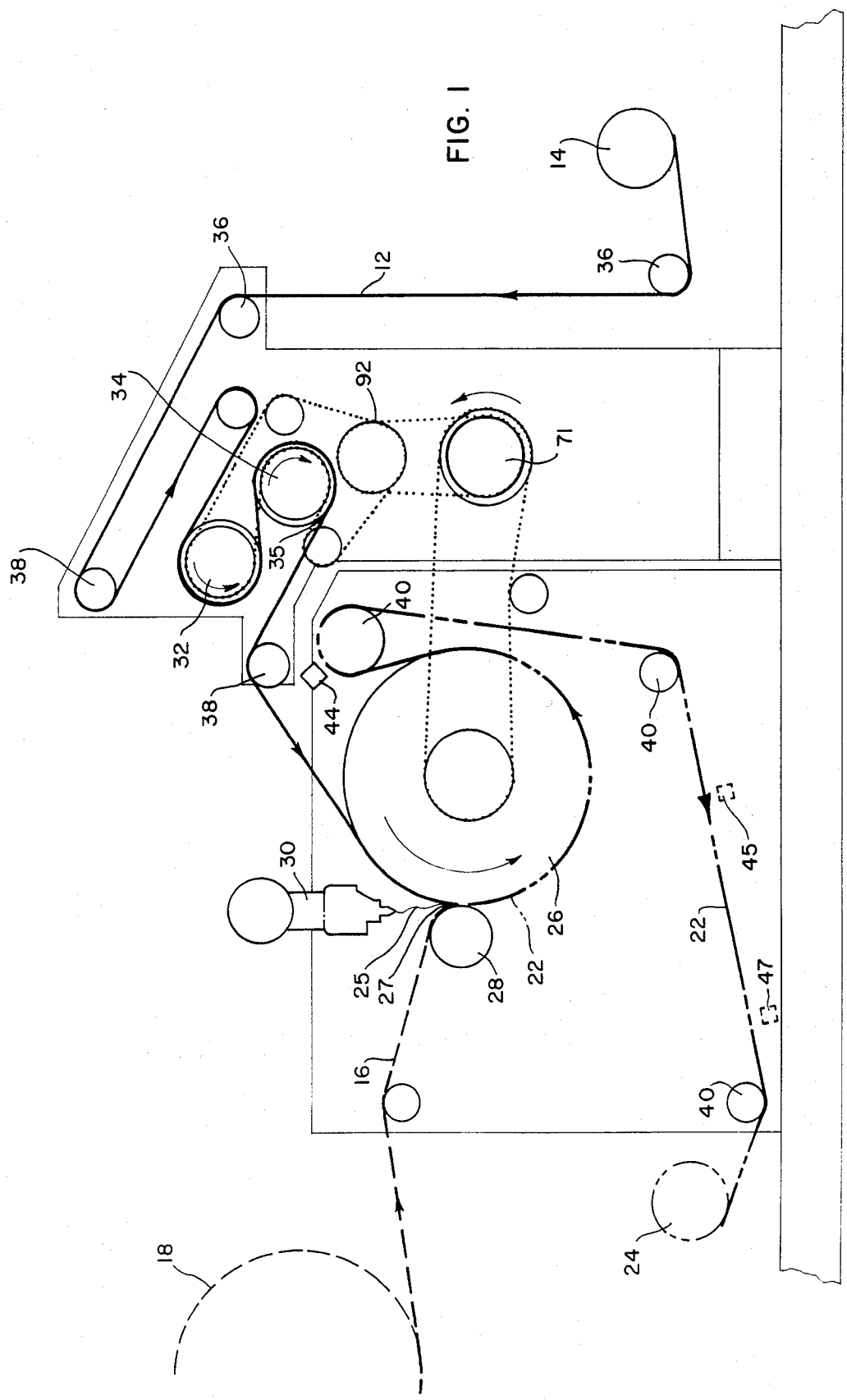
FIG. 1 is a schematic side elevation view showing the operation of a laminating device.

As illustrated schematically by FIG. 1, the laminating device 10 of the present invention comprises a film supply means such as film spool 14 for supplying extensible plastic film material 12 to be laminated with paper material 16 provided from a paper supply means such as a paper spool 18. A composite collection means such as a composite take up spool 24 is provided for collecting the composite film/paper material after lamination. The film 12 upon leaving the film spool 14 may pass over one or more cylindrical idler rolls 36 which may be used to straighten and flatten the film 12 as it leaves the spool 14 and which also functions to properly align the film material 12 with a first motive means such as S-wrap rolls 32, 34. The motive means provides the motive force for drawing the film 12 from the film supply means and also cooperates with a second motive means in controlling the stretch in the film material, as decribed in further detail below. In the embodiment illustrated in FIGS. 1-4 the first motive means comprise S-wrap rolls 32, 34. The two equal radius cylindrical rolls 32, 34 are positioned in parallel axial alignment and rotate in opposite directions at the same speed. The surface of the rolls 32, 34 must be sufficiently smooth to avoid damaging the plastic film 12 and yet must provide sufficient frictional contact with the film 12 to prevent slipping between the film and roll surfaces. The film web is wrapped in an S-shaped configuration over and around the upstream roll 32, then over and around the downstream roll 34, as illustrated in FIG. 1. This so called "S-wrap" configuration enhances the frictional contact between the film 12 and rolls 32, 34 providing a nonslipping "nip effect" relationship wherein the rate of film advance upon leaving the rolls 32, 34 is equal to the tangential speed component at the surface of the rolls 32, 34. After leaving the first motive means the film 12 passes into a second motive means which in the preferred embodiment also functions as a laminating means. The second motive means may comprise a laminating nip 27 such as formed by laminating rolls 26, 28.

In the preferred embodiment one or more idler rolls 38 may be used to position the film 12 at a proper entry angle into the laminating nip 27. The film 12 and paper 16 are treated with an adhesive material such as for example a melted polymer plastic 25 supplied by an adhesive supply source 30 which causes permanent bonding of the paper 16 and plastic 12 as it passes through the laminating nip 27. The laminating rolls 26, 28 may comprise a main roll 26 containing cooling (or heating) elements to aid in the production of the adhesive bond between the paper and film. The main roll 26 is driven by a main drive means such as main drive motor 50 illustrated in FIG. 2 and discussed in further detail below. Compression roll 28 may also be driven by the same drive motor 50 or may alternatively be driven by rolling contact with the main roll 26.

The laminating nip 27 formed by laminating rolls 26, 28 draws the film 12 and paper 16 therethrough and simultaneously compresses it to form laminated composite 22.

Again it should be noted that nonslipping contact between the moving surface of the second motive means and the film 12 is essential to the operation of the invention. In the preferred embodiment this nonslipping contact is ensured by the relatively large surface area of the main roll 26 over which the film is wrapped as well as the compressive force exerted by the compression roll 28 at the laminating nip 27. As with the S-wrap rolls 32, 34, the surfaces of the compression roll 28 and main roll 26 must be sufficiently smooth to avoid damaging the film 12 and paper 16 and may comprise polished steel.

Nonslipping frictional contact between the main roll 26 and film ensures that the rate of film advance through the laminating nip will be equal to the tangential velocity component of the surface of the main roll 26. Thus the rate of film advance at the point the film leaves the S-wrap rolls 32, 34 and the rate of film advance at the laminating nip 27 is directly proportional to the rotational velocity of the S-wrap rolls 32, 34 and the rotational velocity of the main roll 26 respectively. By changing the rotational velocity of the S-wrap rolls 32, 34 with respect to the rotational velocity of the main roll 26 a speed differential is created in the film web between the point 35 where the film leaves the S-wrap rolls 32, 34 and the point that it enters the laminating nip 27. By increasing the rotational speed of the S-wrap rolls 32, 34 with respect to the main roll 26 so that the tangential velocity component at the surface of the S-wrap rolls 32, 34 exceeds the tangential velocity component at the surface of the main roll 26, the film web therebetween is caused to relax. By decreasing the relative speed of the S-wrap rolls 32, 34 with respect to the main roll 26 the film is caused to stretch. The amount of stretch or relaxation in the film is dependent on the amount of difference between the surface speeds of the S-wrap rolls 32, 34 and main roll 26. Upon leaving the laminating nip 27, composite 22 may pass over another series of idler rolls 40 and is thereafter received by a collection means such as composite take up roll 24. Alternatively it may be further processed as by cutting and folding devices (not shown) to form a final or more completed product.

Figure 4:
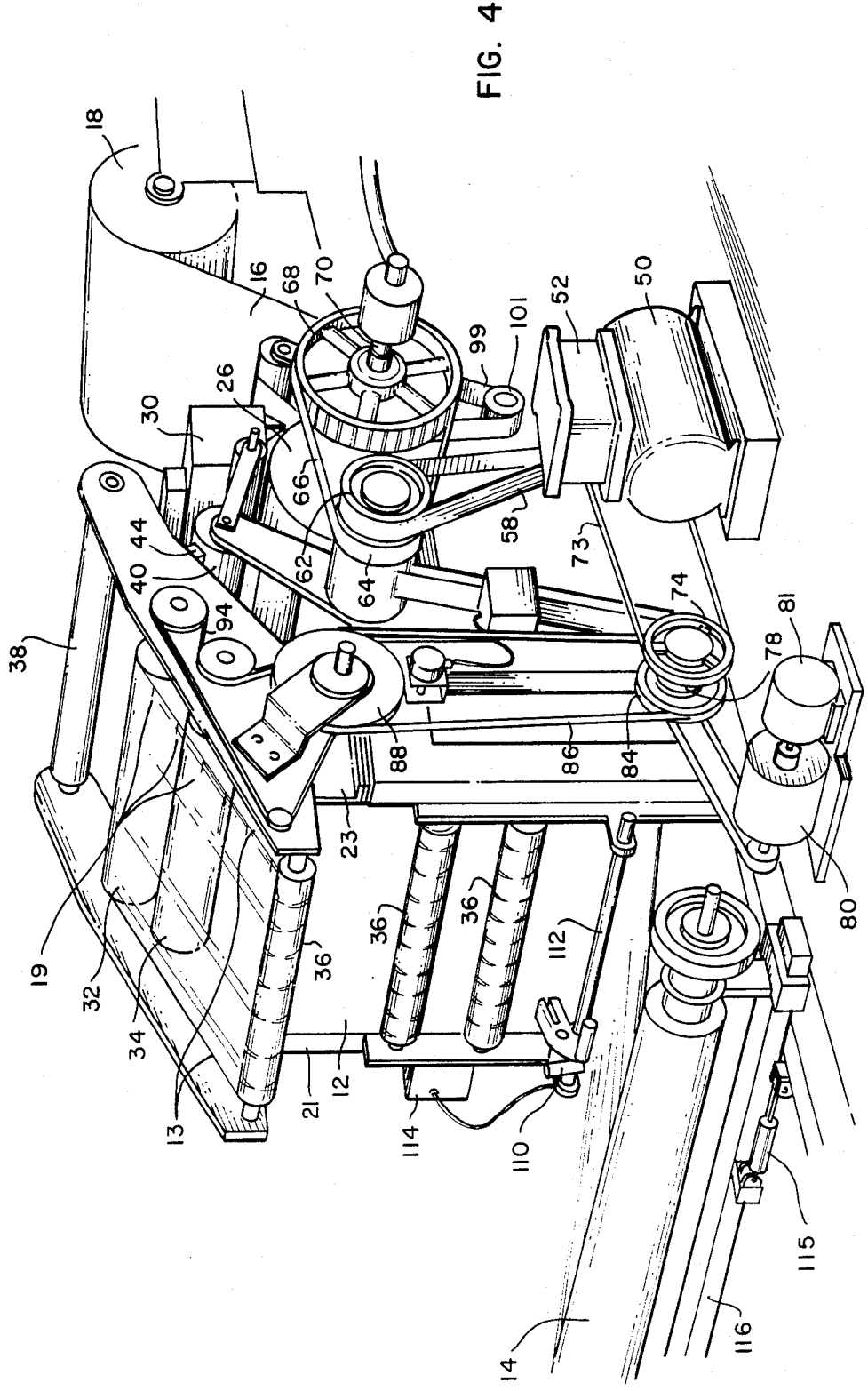
FIG. 4 is a perspective view of a laminating device of the type shown in FIG. 1.

The relative stretch in the film 12 subsequent to lamination with the paper 16 is measured by a monitoring means. In the preferred embodiment the film 12 is provided with photoelectric readable preprinted marks 19 positioned at equally spaced points near one edge of the film 12 as shown by FIG. 4. The distance between these marks 19 will be referred to hereinafter as the "repeat length". As previously mentioned, the laminating device is designed to stretch or relax the film 12 in order to laminate a predetermined portion of the film 12 to the paper backing material 16. The distance between the marks in this ideal or design condition will be referred to as the "design repeat length". However, during operation of the laminating device 10, the film 12 will stretch and relax and thus the distance between marks may deviate from the design repeat length until the system corrects itself, as discussed hereinafter. The actual distance measured between marks 19 by the monitoring means, described hereinafter, will be referred to as the "actual repeat length".

The monitoring means provides data to a data processing means from which the amount of stretch or relaxation in the film may be computed. The data processing means provides a control signal to a first motive means speed control means responsive to the monitoring means data to selectively vary the speed of the first motive means with respect to the second motive means for imparting a predetermined amount of stretch or relaxation to the film as it passes between the first and second motive means.

In the illustrative embodiments the monitoring means comprise photoelectric sensing means such as photoelectric unit 44 is positioned at some point near the path of the composite web 22 downstream from laminating nip 27 for detecting the preprinted spaced apart marks 19 on the film 12 edge. The photo electric unit operates in a conventional manner by sending out an electronic pulse signal in response to a disturbance in a beam of light (not shown) provided by the unit. In this use of the photo electric unit with the present invention the disturbance in the light beam is produced by the passage therethrough of a preprinted mark 19. The photoelectric unit 44 might be any of a number of commercially available high speed units such as MEI Services Inc.'s Scan-A-Matic Model PLM-2000.

Figure 2:
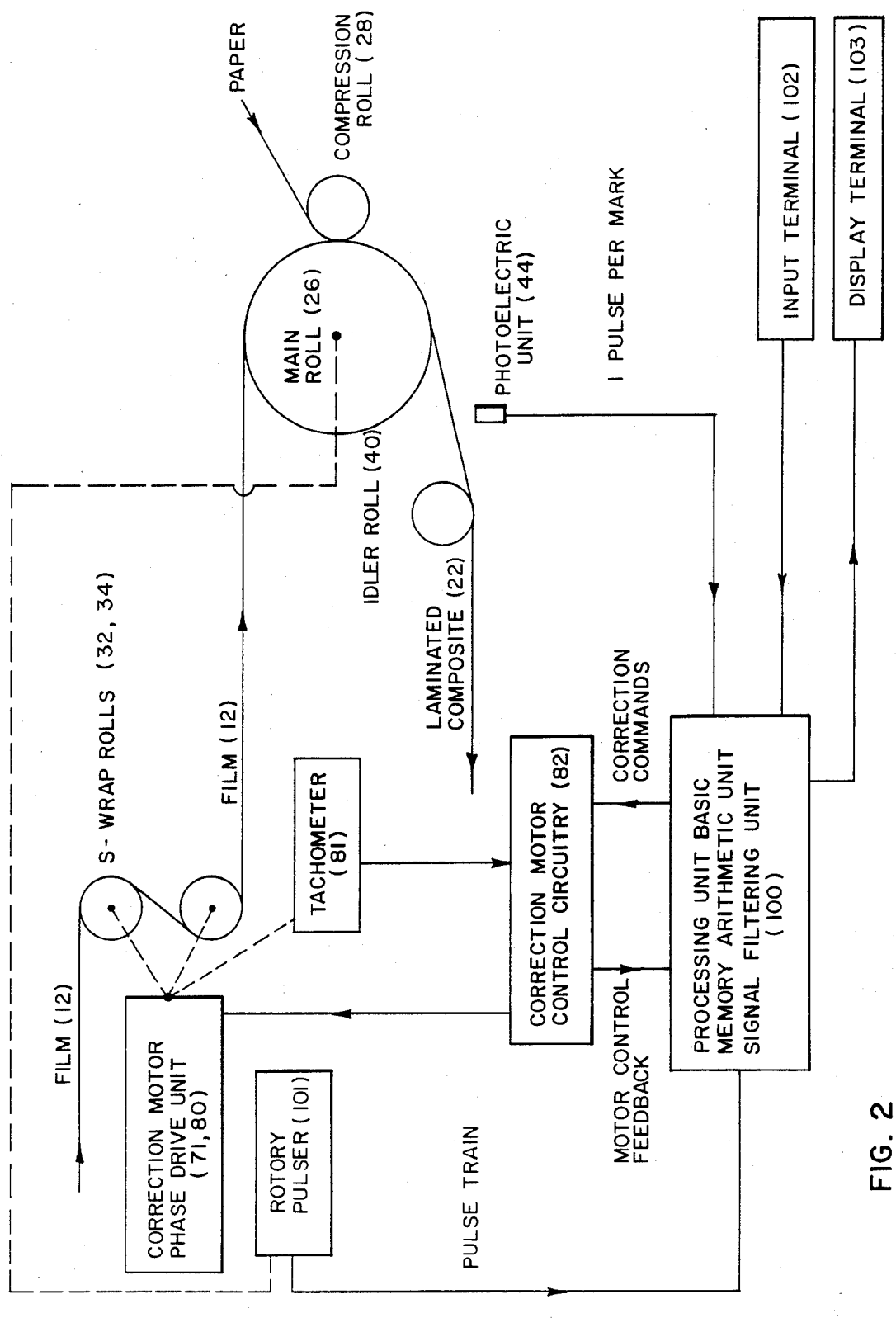
FIG. 2 is a schematic drawing showing the monitoring and control functions of the laminating device of the type shown in FIG. 1.

In the preferred embodiment as illustrated schematically by FIG. 2 the photoelectric unit 44 provides a single electronic pulse signal to the data processing means which may be an electron data processing unit 100, each time a printed mark is detected. As further illustrated by FIG. 3, a continuous electronic pulse train is also provided as input to the data processing unit 100 by a rotary pulser unit 101. The rotary pulser is rotatably connected, as by a drive belt 99 (FIG. 4) or other conventional means, to one of the drive shafts in the main roll 26 drive system, described in further detail hereinafter. The rotary pulser 101 emits a fixed number of pulses per revolution of the drive system component typically on the order of 3,000–6,000. Thus the pulse train receives its master speed reference from the main roll drive system providing a time base for computer operations described below. The rotary pulser may be of a commercially available type such as the Baldwin 5V278 Optical Incremental Encoder.

The data processing unit 100 is programmed by a convention circuitry well known in the art to count the number of pulses input from the rotary pulser 101 between consecutive pulses detected by photoelectric unit 44. In slightly different language, the signal from the photoelectric unit initializes a "count window" which is loaded with digital data. The data is loaded into memory at the detection of the next mark and a new count window is simultaneously initialized for the next data loading.

The digital data from each count window is processed to determine the actual repeat length of the film passing the photoelectric unit 44 and the result is compared by means of conventional comparator circuitry well known in the art to a value representing the design repeat length which is stored in memory. Electronic correction commands are generated based on the deviation between the actual and design repeat lengths and provided as input to correction motor control circuitry 80.

Operator input from a conventional input terminal 102 of a type well known in the art provides processing information such as the design repeat length and the amount of deviation of the actual repeat length from the design repeat length required to initiate correction commands as well as the number of count window repeats required to initiate correction commands.

The electronic correction commands provided to the control circuitry 82 are converted thereby to analog output which is supplied to the direct current correction motor 80 mechanically linked to a phase drive unit 71. A conventional motor speed monitoring means such as a tachometer generator 81 is operably connected to the correction motor drive shaft and outputs a tach signal which is provided to the correction motor control circuitry 82.

The mechanical output of the phase drive unit 71 is drivingly linked to the S-wrap rolls 32, 34, discussed in further detail hereinafter and the rotational speed of the rolls 32, 34 is thus controlled with respect to the main roll 26 rotational speed by mechanical input from the correction motor 80.

Thus by calculating the actual repeat length of the laminated composite 22 with information supplied by the rotory pulser 101 and photoelectric unit 44 and comparing the result to the design repeat length, the processing unit 100 controls the speed of the S-wrap rolls 32, 34 through appropriate control circuitry and a phase drive system to control the stretch or relaxation of the film 12.

As indicated by phantom lines in FIG. 1 the method of monitoring the film repeat length may be varied slightly by using two photoelectric assemblies 45, 47 positioned at a spaced apart distance equal to the design repeat length of the film. In this embodiment a count window is initialized by a mark detection pulse from one photoelectric detector and terminated by a mark detection pulse from the other photoelectric detector. If the actual repeat length is equal to the design repeat length consecutive spaced apart preprinted marks 19 pass the detectors 45, 47 simultaneously leaving no time gap between the pulse signals generated thereby. Thus no pulse train digital data enters the count window. However, any deviation of the actual repeat length from the design repeat length will cause the marks 19 to pass the detectors 45, 47 at different times producing a time differential between the pulse signals produced by the detectors 45, 47. The time differential between signals allows pulse train data to be loaded into the count window, the number of pulse train pulses in the window indicating the amount of error in length. Thus in this embodiment no operator input to the processor 100 is required to indicate the design repeat length but the photoelectric devices 45 and 47 must be physically positioned at a distance equal to the design repeat length or some multiple thereof.

The processing unit 100 may also be provided with a display 103 for displaying various information such as actual repeat length, repeat length error, time response data, etc. depending upon the programming software used.

Figure 3:
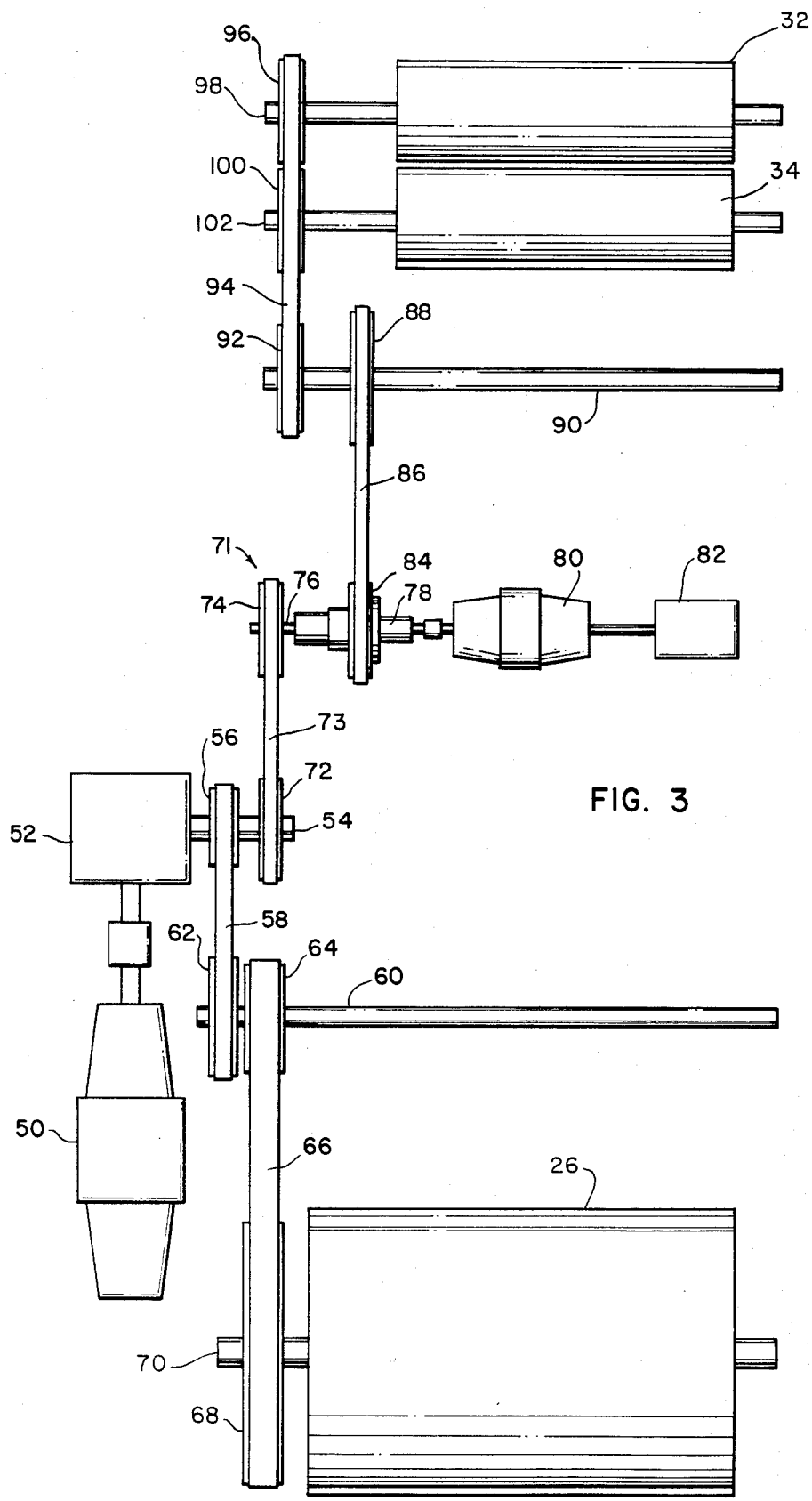
FIG. 3 is a schematic plan view showing the major elements of the drive train of a laminating device of the type shown in FIG. 1.

The mechanical linkage of the laminating device is illustrated in FIG. 3. A main drive means such as main drive motor 50 is operably connected to a main gear box 52 which in turn drives main drive shaft 54. Main drive shaft pulley 56 mounted on shaft 54 is connected by means of drive belt 58 to a secondary drive shaft pulley 62 coaxially mounted on secondary drive shaft 60 with pulley 64. Pulley 64 is operably connected to main roll pulley 68 by another belt 66 whereby the main roll 26 is rotated about main roll drive shaft 70. S-wrap rolls 32, 34 are mechanically linked to phase drive unit 71 and main drive motor 50 as by main drive shaft parasite pulley 72 operably connected by belt 73 to phase drive pulley 74, in turn mounted on phase drive shaft 76. Phase drive shaft 76 is operably connected by conventional means well known in the art to a differential unit 78, such as for example a Conac 25 Differential Unit, having a phase drive correction pulley 84. Phase drive correction pulley 84 is operably connected by means of a drive belt 86 to conversion pulley 88 mounted on conversion drive shaft 90 upon which S-wrap connector pulley 92 is coaxially mounted. S-wrap roll belt 94 is operably connected to upper S-wrap roll pulley 96 and lower S-wrap roll pulley 100 in an S-wrap configuration (FIG. 4) whereby first and second S-wrap shafts 98, 102 and consequently S-wrap rolls 32, 34 are rotated in opposite directions at the same speed.

Mechanical input to differential unit 78 is provided by correction motor 80 for the purpose of increasing or decreasing the rotation speed of phase drive correction pulley 84. The correction motor rotational input is added or subtracted from the speed of shaft 76 by an internal differential gearing mechanism (not shown) of a type well known in the mechanical arts. Correction motor 80 is actuated and controlled by correction motor control circuitry unit 82 which in turn receives commands from processing unit 100 as discussed in further detail herein.

The electronic components of the system will now be described in further detail with reference to FIG. 5.

In the presently preferred embodiment, the electronic data processing unit 100 can be any industrial rated 8-bit microprocessor hereinafter CPU (Central Processing Unit), compatible RAM (Random Access Memory) and EPROM (Electrically Programable Read Only Memory) memory devices, and required interface and signal conditioning components. In the presently preferred embodiment of the invention, the Intel Corporation 8085 CPU and associated memory devices were chosen, which may include an Intel SBC 094 RAM unit, and an Itel 2732 EPROM unit.

Figure 5:
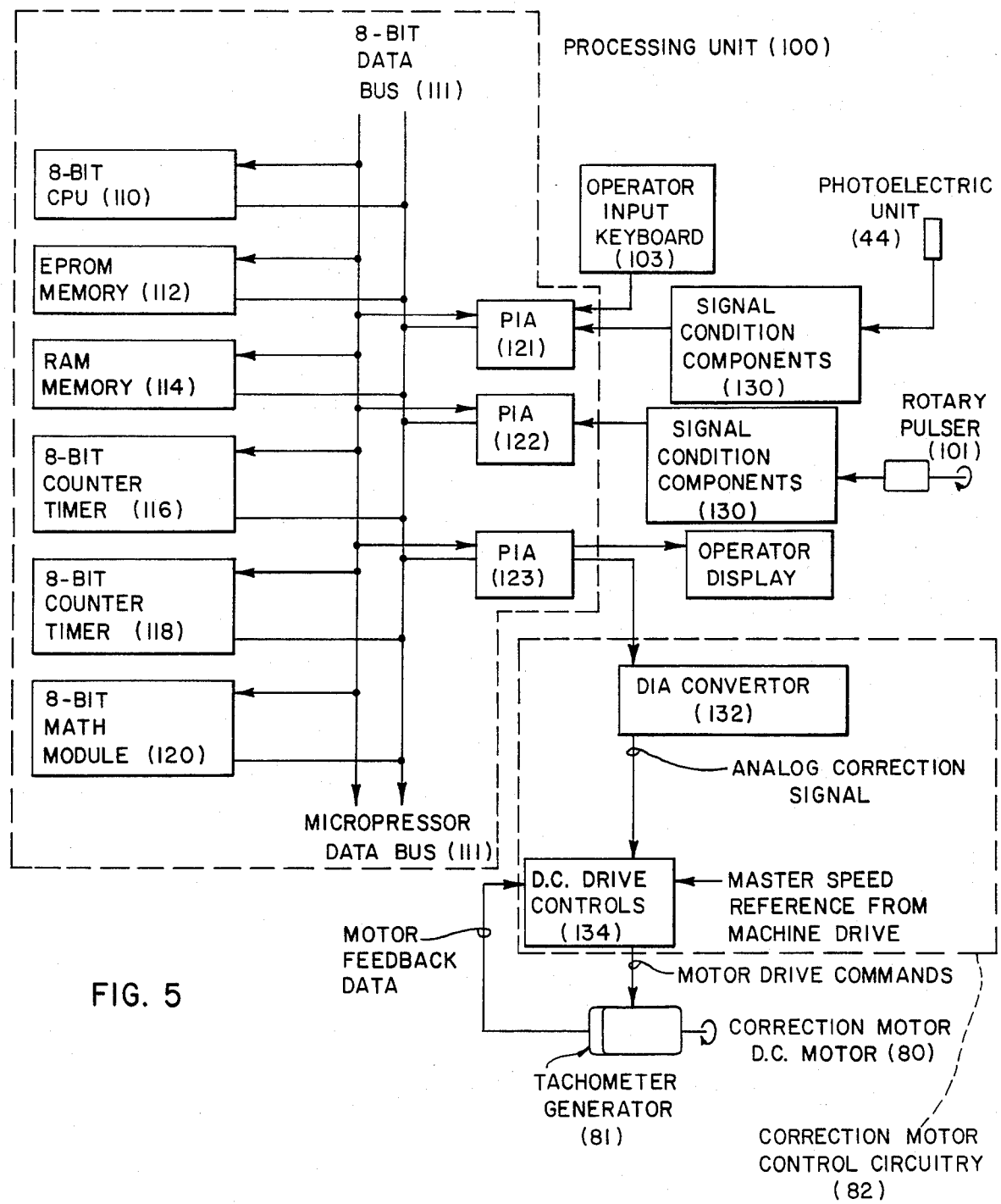

As illustrated by FIG. 5, the CPU 110, EPROM memory 112, RAM memory 114, and a conventional 8-bit counter timers 116, 118, and 8-bit math module 120 are connected to a conventional system bus 111 such as an Itel Bus compatable with an Itel corporation 8085 CPU. The counter timers 116, 118 may comprise conventional units, such 8254 and the math module 120 may be an Itel M8231.

Prior to controlled processing of the extensible film 12 in the laminating device 10, the operator must determine manually the correct repeat length in inches, and the allowable error. This data is easily determined by physical measurement or previous run experience. The repeat data is entered through the operator input terminal keyboard 102 which is arranged in the form of a standard typewriter keyboard with output ports for microprocessor interface. The keyboard is wired so that depression of a button completes the circuit and the associated data bit is connected to PIA (Periferal Interface Adapter) 121. The PIA 121 may be an Intel 8212 chip having two 8-bit Input/Output ports for interface to peripheral devices. One part of PIA 121 is dedicated to keyboard 102 input while the other part is dedicated to conditioned data input from the mark scanning photoelectric unit 44. The photoelectric unit 44 provides an input pulse for each repeat length mark that passes through its radiated beam, as explained above.

Program software stored in EPROM memory 112 transforms the previously entered repeat length and error into digital counts directly related to digital data received from external roto pulser 101.

The roto pulser 101 provides variable numbers of digital count pulses and pulse widths dependent on roto pulser shaft speed and internal construction. The digital count pulses are filtered and conditioned to eliminate false signals and provide constant levels by conventional signal conditioning components 130 of a type well known in the art. The conditioned digital count pulses are wired directly to PIA 122, of similar or identical construction to PIA 121, which is in turn wired to a data bus 111, as illustrated in FIG. 5.

Program software stored in EPROM memory 112 ,instructs the CPU 110 to orient a counter/timer 116, 118 as an 8-bit counter that will continuously count and record roto pulser digital inputs. Additional software in EPROM memory 112 also instructs the CPU 110 to retrieve the count data from the counter 116, 118 on the leading edge of a photoeye pulse and reset the counter on the falling edge of the unit 44 pulse. The counter will then proceed with its counting duties while the previous count is transferred to RAM 114 memory for utilization. Previous operator input has specified the number of count updates to be collected and stored prior to calculation of actual repeat length. In lamination of extensible films count updates can range from 1 to 10 with a number less than 5 being desirable.

Once the specified number of count updates has been achieved program software in EPROM instructs the CPU 110 to calculate the average actual repeat and compare this to the desired repeat previously stored in memory.

If the calculated average repeat is within the limits of allowable error, then no correction is required and the system continues its monitoring.

If the calculated average repeat is less than or greater than the allowable error program software in EPROM memory 112 instructs the CPU to output the appropriate error correction signal through PIA 123, of identical constuction to PIA 121 and 122, to digital to analog convertor 132 (DIA convertor).

The D/A convertor 132 is of conventional construction well known in the art such as a Burr Brown DAC 74 unit and outputs a 0-8 VDC signal which is directly wired to the input of a summing amplifier circuit (not shown) with proportional rate feed back. This summing amplifier circuit is a standard commercially available circuit card incorporated in a D.C. drive motor controller 134. The motor controller 134 in the preferred embodiment may be a Reliance Electric Company "Flex-Pak Plus" with regeneration. The drive controller 134 derives its master speed reference from the machine main drive motor 50 and is geared in the correct ratio to provide a speed match on the surface of the main roll 26 and the S-Wrap correction rolls 32, 34. The correction motor tachometer generator 81 closes the feedback loop to the drive controller 134 and insures proper speed regulation. The analog signal from the D/A convertor 132 is summed with the master speed reference and will produce up to a ±5% speed variation of the correction motor with respect to the main drive, depending on the analog signal. The speed variation produced by the correction motor 80 with respect to the main roll 26 then produces the stretch control required by the process. The Flex-Pak Plus which may be used as controller 134 and an associated ¾ H.P. D.C. motor which may be used as correction motor 80 are standard commercially available components. Such devices may be factory modified to accept both an operator manual input adjustment for draw control and the control system input. The operator display terminal 103 may be any standard commercially available CRT with interface ports configured for connection to the Intel Bus. Through program software the system can display on the CRT such parameters as web line speed, repeat length, repeat error, repeat tendency, and web tension.

A typical production unit embodying the above described features of the invention having support means such as vertical support blocks 21, 23 wherein the various rolls and other system components are journeled or otherwise operably mounted is illustrated in FIG. 4. FIG. 4 also illustrates additional apparatus for monitoring and controlling the lateral position of the film 12. A photo electric sensing device 110 of a conventional type is mounted at a predetermined position on transverse rod 112 immediately above the lateral edge of film 12. The photoelectric sensing device 110 sends edge location information to a control box 114 having conventional circuitry for actuating a power means such as hydraulic cylinder 115 to move the film roll 14 laterally, as on sliding base 116 whereby the film edge is maintained in proper position for entry into laminating device 10.

It is contemplated that the inventive concepts herein described may be variously otherwise embodied and it is intended that the appended claims be construed to include alternative embodiments of the invention except insofar as limited by the prior art.

What is claimed is:

1. An apparatus for laminating extensible film material to a paper material to form a laminated composite said apparatus having a continuous sheet of extensible film advancing therethrough comprising:
   (a) support means for supporting various rotational elements of said apparatus;
   (b) film supply means for supplying a continuous sheet of film to be laminated mounted on said support means;
   (c) paper supply means for supplying a continuous sheet of paper to be laminated mounted on said support means;
   (d) first S-wrap roll means operably mounted on said support means for advancing a portion of the film wrapped about the surface thereof;
   (e) second s-wrap roll means operably mounted on said support means in parallel alignment with said first S-wrap roll, for advancing a portion of the film wrapped about the surface thereof said sheet of film being wrapped about said first and second S-wrap roll means in nonslipping frictional contact therewith in an S-shaped configuration whereby said film sheet is advanced by the rotation of said S-wrap rolls;
   (f) S-wrap drive means linkingly attached to said first and second S-wrap roll means for rotating said S-wrap roll means in opposite directions;
   (g) main roll means operably mounted on said support means for advancing a portion of the laminated composite wrapped about the surface thereof;
   (h) main roll drive means linkingly attached to said main roll means for drivingly rotating said main roll means;
   (i) compression roll means operably mounted in said support means in parallel alignment with said main roll means for rollingly compressing said sheet of film and said sheet of paper between said main roll means and said compression roll means whereby the film and paper are simultaneously laminated and advanced at a rate equal to the surface speed of said main roll means;
   (j) composite take up means for collecting the composite formed from lamination of said film and paper, said take up means comprising a tension means for maintaining tension in said composite;
   (k) stretch detection means for detecting the spacing between preprinted marks on said film;
   (l) data processing means for receiving input from said stretch detection means and computing the stretch or relaxation in said film therefrom;
   (m) speed control means for controlling the speed of said S-wrap drive means, said speed control means receiving control commands from said data processing means, said control commands being dependent on input from said stretch detection means;
   wherein said first and second S-wrap rolls are positioned downstream of said film supply means, said main roll and said compression roll are positioned downstream of said first and second S-wrap rolls and said composite take up means is positioned downstream of said main roll and said compression roll with respect to the direction of said film advance; and
   wherein the rate of rotation of said S-wrap rolls is selectably variable with respect to the rate of rotation of said main roll and compression roll during composite formation whereby the portion of said sheet of film positioned therebetween may be stretched or relaxed.

2. The invention of claim 1 wherein stretch detection means comprises:
   (a) a mark detection means for detecting the passage of a mark in the proximity thereof and sending an electronic detection pulse to said data processing means in response to said detection, said mark detection means being positioned proximate said film portion of said laminated composite at a predetermined position downstream from said compression roll means; and (b) a pulse train generating means for providing a continuous, high frequency, electronic pulse train to said data processing means the frequency of said pulse train being dependent upon the rate of rotation of said main roll means.

3. The invention of claim 2 wherein said mark detection means comprises at least one photoelectric means for generating an electric pulse signal in response to a mark passing through a fixed beam of light provided by said photoelectric means.

4. The invention of claim 3 wherein said photoelectric means comprises a single photoelectric means wherein said data processing unit computes the distance between detected marks based on the number of high frequency pulses generated by said pulse train generating means between consecutive detection pulses signals.

5. The invention of claim 3 wherein said detection means comprises two spaced apart photoelectric units wherein the spacing of said photoelectric units is a predetermined distance;

and wherein said data processing means computes the difference between said predetermined distance between photoelectric units and the distance between detected marks by counting the number of pulses in said continuous pulse train between the detection pulses input by said spaced apart photoelectric units whereby error from a predetermined design spacing is calculated.

6. The invention of claims 1, 2, 3, 4, or 5 wherein said S-warp drive means comprises:

(a) said main roll drive means;

(b) differential unit means for receiving a master rotational input from said main roll drive means and differentially transmitting rotational output to said S-wrap rolls; and (c) correction motor means operably attached to said differential unit means for increasing or decreasing said rotational output with respect to said master rotational input.

7. The invention of claim 1 further comprising adhesion supply means for supplying a bonding agent to said film and paper prior to lamination.

8. The invention of claim 1 further comprising lateral spacing means for moving said sheet of film laterally with respect to said sheet of paper whereby said paper and film are properly laterally aligned prior to lamination.

9. The invention of claim 8 wherein said lateral spacing means comprises a photoelectric lateral detection means for detecting a lateral edge of said film and servomotor means for moving said film supply means laterally in response to control commands from said photoelectric lateral detection means.

10. An apparatus for laminating a moving web of plastic film material to a moving web of paper material to form a moving web of laminated composite, the film material passing through the apparatus in a continuous longitudinally extending web having an upstream portion entering the apparatus and a downstream portion exiting the apparatus; the film material normally being extensibly deformable such that the longitudinal distance between any two reference points on the film web may vary significantly during lamination; the apparatus comprising:

(a) support means for supporting various components of the apparatus;

(b) paper supply means operably mounted on said support means for providing a continuous supply of paper to be laminated;

(c) film supply means operably mounted on said support means for providing a continuous supply of film to be laminated;

(d) first motive means operably mounted on said support means positioned downstream said film supply means for advancing a first portion of film web passing therethrough at a first film web speed;

(e) second motive means operably mounted on said support means positioned downstream said first motive means for advancing a second portion of film web passing therethrough a second film web speed;

(f) motive means speed varying means for varying said first film web speed with respect to said second film web speed for selectively stretching or relaxing the portion of said film web positioned between said first motive means and said second motive means;

(g) laminating means operably mounted on said support means for bondingly compressing said film web to said paper web to form a laminated composite continuous with said film web;

(h) film length monitoring means for measuring the length of predetermined portions of said film web at a position downstream said second motive means and for providing a monitor signal to a data processing means;

(i) data processing means for comparing said monitor signal to a predetermined length value and providing command signals responsive thereto to said motive means speed varying means for adjusting said first film web speed relative said second film web speed for imparting a predetermined amount of stretch or relaxation to said film web whereby predetermined portions of said film web are continuously extensibly adjusted to a predetermined length.

11. The invention of claim 10 wherein said first motive means comprises first rotatable means driven by a first drive means and wherein said second motive means comprises second rotatable means driven by a second drive means.

12. The invention of claim 11 wherein said first drive means comprises parasitic drive means for parasitically drivingly linking said first rotatable means to said second drive means whereby both said first and second rotatable means are driven by said second drive means.

13. The invention of claim 12 wherein said first drive means further comprises phase drive means for differentially adding or subtracting rotational motion to said first rotatable means.

14. The invention of claim 11 wherein said data processing means comprises micropressor means for processing electronic data.

15. The invention of claim 10 wherein said laminating means comprise said second motive means.

16. The invention of claim 15 wherein said laminating means comprises:

a main roll means for rollingly advancing portion of said film web wrapped thereabout; and compression roll means for pressing said paper and said film web against said laminating roll to form a laminated composite; and adhesion supply means for supplying adhesive material to said paper and film web prior to lamination.

17. The invention of claim 16 wherein said first motive means comprises at least two spaced apart draw rolls means about which said film web is operably wrapped said rolls having synchronized rotation means whereby the tangential speed components at the surface of all said draw roll means are equal.

18. The invention of claims 11, 12, 13, 14 or 15 wherein said film length monitoring means comprise:
   detection means for detecting the passage of preprinted indicia on said film web at a position downstream of said second motive means for providing a detection signal to said data processing means in response thereto; and
   machine speed monitoring means for providing a machine speed reference signal proportional to said paper web speed to said data processing means.

19. The invention of claim 18 wherein said detection means comprises at least one photoelectric means for generating an electric pulse signal in response to a preprinted mark in said film web passing through a fixed beam of light.

20. The invention of claim 19 wherein said photoelectric means comprises a single photoelectric unit wherein said data processing means computes the distance between detected marks based on the number of high frequency pulses generated by said pulse train generating means between consecutive detection pulses signals.

21. The invention of claim 19 wherein said detection means comprises two spaced apart photoelectric units wherein the spacing of said photoelectric units is a predetermined distance;
   and wherein said data processing means computes the difference between said predetermined distance between photoelectric units and the distance between detected marks by counting the mumber of pulses in a continuous machine speed pulse train provided by said machine speed monitoring means, between the separate detection pulses input by said spaced apart photoelectric units whereby error from a predetermined design spacing is calculated.

22. A system for continuously laminating a continuous length of stretchable film material having repreated uniform length indicia thereon to a continuous length of paper material, and comprising:
   film material unwind reel means for supporting a continuous length roll of the plastic film material;
   paper material unwind means for supporting a continuous length of the paper material;
   laminating means having a pair of laminator roll means mounted in closely spaced juxtaposition to one another to define a nip area therebetween through which the plastic film material andthe paper material are continuously drawn from said film unwind means and said paper unwind means and fed in adjoining relationship, and having an adhesive applying means for applying adhesive material between the plastic film material and the paper material in the nip area for forming a continuous length laminate material with the uniform length indicia on the plastic film material being visible on one side of the laminate material;
   said laminating roll means providing feed means for causing continuous movement of the film material and the paper material from said film material unwind means and said paper material unwind means to the nip area and through said laminator roll means;
   tension roller means mounted between said film material unwind means and said laminator roller means for applying tension to the film material therebetween;
   film tension control means operatively associated with said tension roller means for controlling the amount of film tension between said tension roller means and said laminator means whereby the amount of stretch of the film material therebetween is maintained within predetermined limits so as to maintain uniformity of length of the repreated indicia thereon in the laminate material downstream of said laminator means;
   indicia length measuring means operatively associated with said film tension control means and located downstream of said laminator means for measuring the length of the repeated indicia of the laminate material and actuating said film tensin control means to adjust the film tension and maintain the amount of stretch of the film material within the predetermined limits of uniformity of length of the repeated indicia thereon in the laminate material.

23. The invention as defined in claim 22 and wherein each of the uniform length repeated indicia on the film material comprises a decorative image and a length measurement image and said indicia length measuring means being responsive to said length measurement image.

24. The invention as defined in claim 22 or 23 and said indicia length measuring means comprising at least one photoelectric measuring means mounted in proximity to said laminate material and opposite and in facing relationship to the visible indicia thereon.

25. The invention as defined in claim 24 and wherein there are two photoelectric measuring means spaced from another a distance equal to the desired uniform repeat length of the indicia in the laminate material.

26. The invention as defined in claim 23 and wherein said film tension control means comprising:
   a pair of power driven roller means mounted in spaced relationship to one another and each power driven roller means being in engagement with a separate longitudinal spaced portion of the film material so that the film material travels between said pair of power driven roller means in a S-shaped path; and
   variable speed roller drive means operatively connected to each of said power driven roller means for causing uniform variable speed rotation thereof in response to signals generated by said indicia length measuring means.

27. The invention as defined in claim 23 and wherein said film tension control means comprising:
   a pair of pressure applying roller means defining a nip area through which the film material passes with one of said roller means being a power driven roller means and the other of said roller means being an idler roller means;
   a variable speed roller drive means operatively connected to said one power driven roller means for causing variable speed rotation thereof in response to signals generated by said indicia length measuring means whereby to control the tension and amount of stretch in the film material between the nip area of said laminator roll means and the nip area of said pressure applying roller means.

28. The invention as defined in claim 27 and wherein said variable speed roller drive means comprising:
   a variable speed DC motor means mounted on a shaft means parallel to and operatively connected to said drive roller means so as to be operable independently of said laminator roller means.

29. The invention as defined in claim 28 and further comprising:
   rotational speed measuring means operatively associated with said drive roller means for generating a signal indicative of rotational speed and operatively associated with said motor means to vary the rotational speed thereof.

* * * * *